Nov. 4, 1969  G. A. MITCHELL  3,476,011
VIEWFINDER INCLUDING A PORRO REFLECTING SYSTEM
Filed Nov. 12, 1965  2 Sheets-Sheet 1
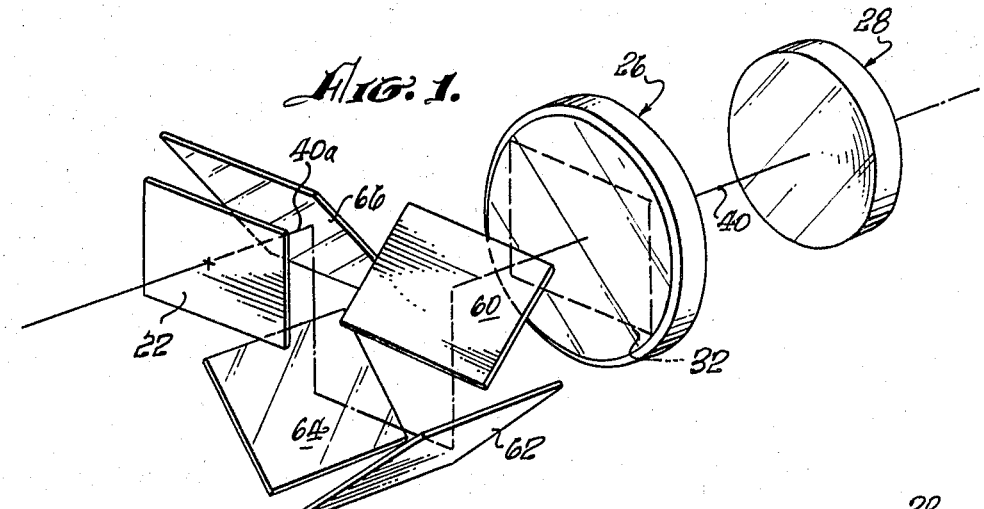
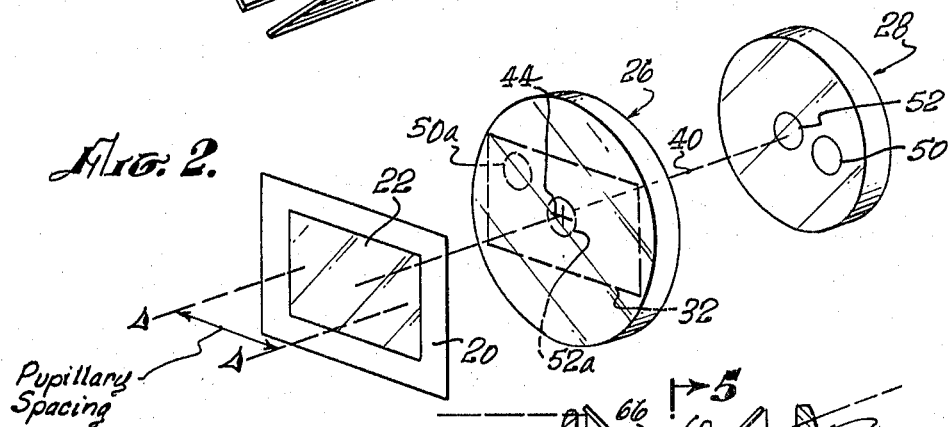
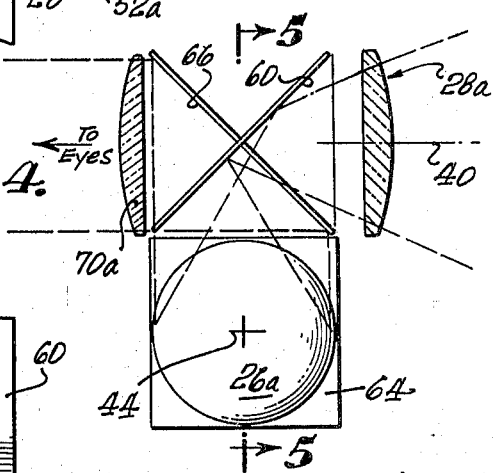
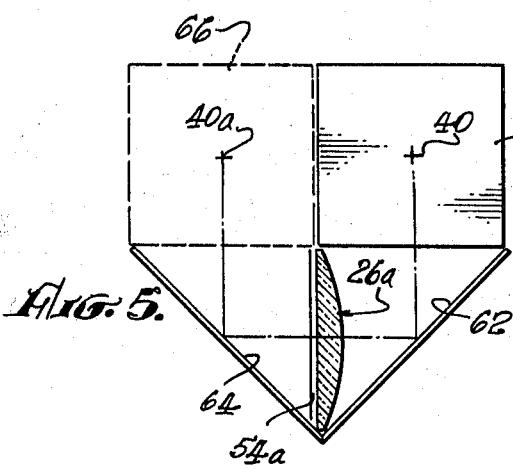
INVENTOR.
GEORGE A. MITCHELL,
By Burkelew & Lewis

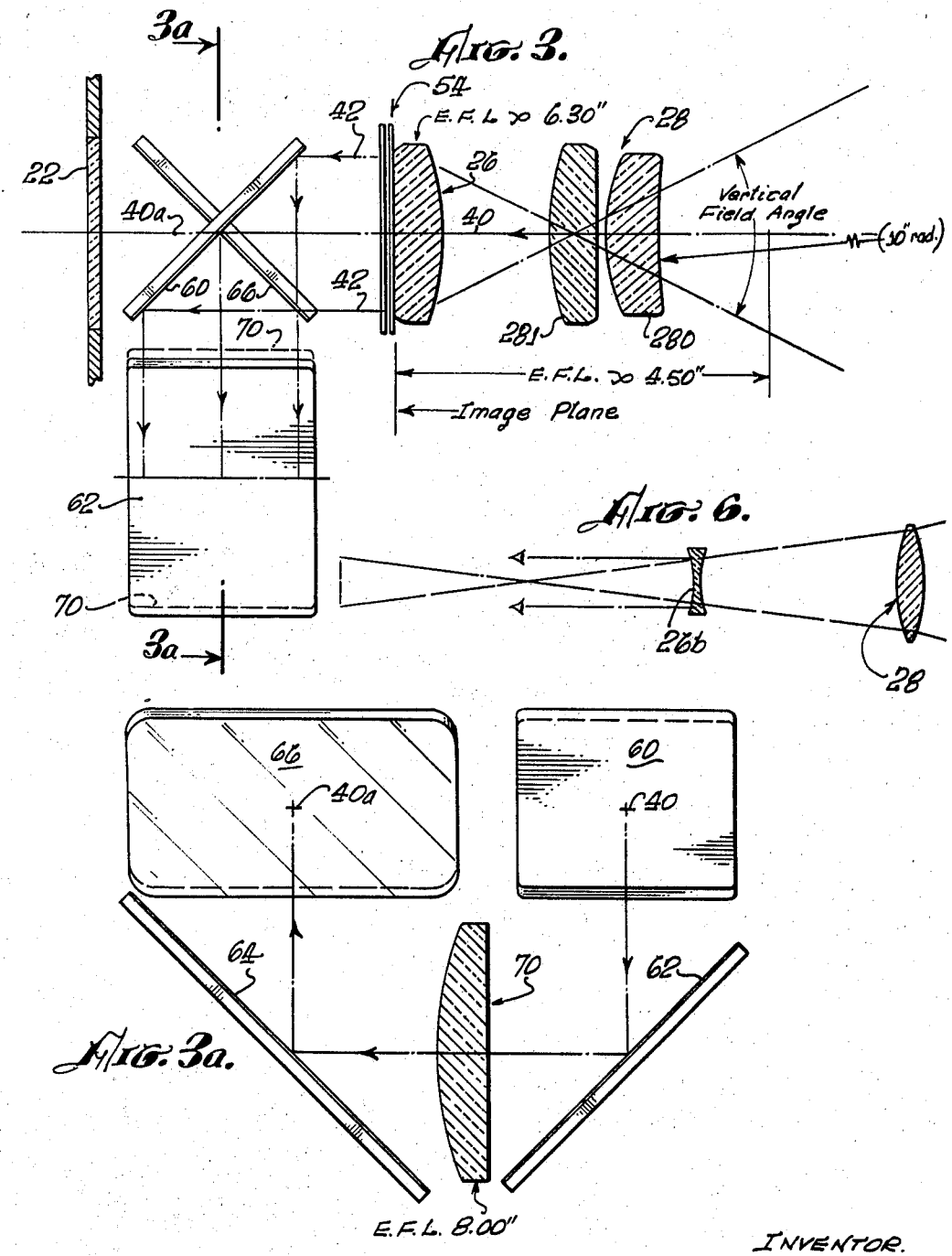

United States Patent Office 3,476,011
Patented Nov. 4, 1969

3,476,011
VIEWFINDER INCLUDING A PORRO REFLECTING SYSTEM
George A. Mitchell, 687 Prospect Crescent, Pasadena, Calif. 91103
Filed Nov. 12, 1965, Ser. No. 507,462
Int. Cl. G03b 13/02
U.S. Cl. 88—1.5                    5 Claims

ABSTRACT OF THE DISCLOSURE

A viewfinder providing a brilliant erect image including an objective, an image erecting system comprising four plane reflectors, a field lens interposed between two of the reflectors, and including frame defining indicia.

---

The present invention relates to optical systems, and, although useful as a finder it is capable of independent use of various kinds for viewing a scene and orienting e.g., a gun or airplane. Consequently, although the following description will deal with use as a finder for such things as cameras and other viewing devices such e.g. as telescopes, the optical system of the present invention may, for instance, be used in lining up such conveyances as a gun, tank, airplane or ship.

General objectives of the invention are to enable a scene and the line-up to be viewed by both eyes; to allow wide lateral displacement of the eyes from alinement with the optical axis; and to allow almost unlimited eye relief. With relation to these objectives it is noted that in most known camera finders, telescopes, binoculars, etc. the eye must be quite accurately positioned both laterally and as to relief.

In certain uses, as for telescopic finding, it may not be necessary that a viewed image be oriented as the scene is normally viewed by the eyes. But for other uses it is desirable that the image be seen normally, without reversals. My optical system provides for rectification, and also for magnification if desired.

Further objectives and accomplishments, such as non-diminishing of the image illumination by stopping down, will be apparent from the following description of a typical and illustrative embodiment. For such descriptive purposes reference is had to the accompanying schematic drawings, in which:

FIG. 1 is a schematic perspective of my optical system with one known type of rectifier;

FIG. 2 is also a schematic perspective illustrating certain features of the invention, but without a rectifier;

FIG. 3 is a schematic longitudinal section, approximately to scale, of the optical system with a rectifier shown;

FIG. 3a is a schematic section to the same general scale on line 3a—3a of FIG. 3 and showing a magnifier;

FIG. 4 is a schematic of a preferred variant,

FIG. 5 is a schematic section on line 5—5 of FIG. 4, and

FIG. 6 is a schematic of another variation.

Reference is first made to FIG. 2. In that figure a framed viewing window is shown. Such a window may be framed as at 20 and glassed as at 22, the frame providing for instance an image area proportionate to the size and/or proportions of an apertured image taken on film in, say, a camera of any type. The image seen through the framed window has, as indicated in FIG. 2, at least one dimension, say width, at least equal to or preferably somewhat greater than normal or largest human pupillary spacing. That spacing may be taken as approximately 2.5 inches. How much a dimension or the dimensions of the framed window is or are greater than normal pupillary spacing is immaterial; preferably it or they may be, say, one-half inch greater.

Optically ahead of the framed window is a field lens or collective 26 and an objective 28, either or both of which may comprise a plurality of lens elements. The field lens 26 may be of such size, not necessarily circular, as to contain a rectangular area equal in size and proportions to the framed area at 20, 22. That equality in size and proportions is indicated in FIG. 2 in broken lines 32 on the field lens 26. If, for example, the largest dimension of the framed rectangular window at 22 is, say, three inches, corresponding to eye pupillary spacing of, say, 2½ inches, the effective diameter of the field lens 26 may be for instance, for a square window, at least approximately 4¼ inches. The field lens may be larger, but unnecessary, as will be understood from this description. The objective 28 can be, as shown, smaller than the field lens.

Objective 28 throws its aerial scene image on the flat face of field lens 26, where the image plane is indicated in FIG. 3. Either, or both, field lens 26 and objective 28 may be adjustably mounted to compensate for image distances from the objective; but in any event the image plane of the objective is at or close to the plane face of the field lens, shown in FIG. 2 as a simple plano-convex lens, as is also the objective. The objective may, of course, be movable to focus its image on the plane face of the field lens. If either is complicated in lens elements, the image plane of the objective is located at a point relative to the field lens such that the latter changes the image-forming bundles of rays from the objective to parallelism for eye viewing. Such parallel bundles of rays are indicated at 42 in FIG. 3. For instance, in a Huygens ocular the objective image plane is between lens elements. But one of the accomplishments of my system is that it requires only very simple lenses of no great accuracy. Accordingly the lenses in FIG. 2 are illustrated as simple plano-convex. They are so, in a demonstrative device in which the framed window has a height of 2 inches and a width of about 2¾ inches. In that demonstrative device the field lens is large enough to take in the rectangular window, but the objective is only two inches in diameter. In that demonstration device the focal length of the fixed objective is approximately 4½ inches, that of the field lens 26 being 6½ inches. However, the focal length of the objective may be anything desired or changeable as in a zoom lens, the field lens being of such design as to direct to parallelism the image forming bundle of rays coming from the objective. A limited amount of deviation from parallelism is accommodated by the eye or eyes. For instance, if the field lens is designed to shift the image forming bundle of rays from the objective to parallelism with the objective focussed on the plane face of the field lens at a field distance of say fifty feet, the image cast by the objective at a close or infinite field distance will be close enough to the plane face of the field lens and the bundles of rays from the field lens will be close enough to parallelism to be eye accommodated. In the demonstration device with its fixed objective and field lens the images of both close-ups and far removes are clearly seen. Either, or both the objective and field lens may be adjustably movable along the optical axis to keep the objective image at the plane of the field lens.

It is to be particularly noted that the objective image at the field lens is aerial. There is in the system no ground glass, or equivalent. The field lens deals with the image forming bundle of rays coming from the objective, and not with rays emitted by a ground glass or equivalent.

FIG. 2 shows central cross hair markings 44 on the image face of field lens 26, the markings crossing at the optical axis 40 of the objective and field lens. As shown here that field lens-objective axis is straight, but the axis may involve two sub-axes at angles to or spaced from each other. For example, a reflector or reflectors may be interposed between objective and field lens, and, as an instance, the rectifier here shown (FIGS. 1 and 3) may be positioned between them, see FIGS. 4 and 5.

The window framing 20 as shown in the figures is not necessary. Its only purpose is to frame the image for, say, a camera. With or without such framing, the two eyes see the image formed by the objective, regardless of the amount of eye relief and also preferably regardless of some amount of lateral eye movement. And it is to be noted, as hereinafter referred to, that the amount of light received by each eye depends entirely on the pupil size, not on the size of the objective. Thus if the pupil is, say, one-eighth inch in diameter, the parallel rays received by the eye are just those rays within that diameter.

Stereoscopic vision of the image is induced by the system. The relatively large objective has a field angle, such as so indicated in FIG. 3. The objective "sees" the field from points on the objective spaced up to or almost as widely apart as the observing eyes. At any rate, although the objective may be much smaller, for stereoscopic purposes it has points of view spaced apart by say, at least a large fraction of normal eye spacing. Thus the objective for this purpose may be as small as two inches in diameter, or even smaller. The objective thus "takes" the field stereoscopically as well as from e.g., a central objective point. The observer's eyes then see and are impressed by that stereoscopic effect.

Lining the optical axis up with any chosen point in the field of view involves only lining up the central crosshairs 44 on that chosen point. It does not involve lining up the eye or eyes; the eye or eyes can be laterally anyplace in the bundle of parallel rays. That, for example, makes the optical system peculiarly useful in lining up, say, a gun or an airplane or any other carrier such as a tank, where vibration or lateral movement may be great. The rectifying system here shown in FIGS. 3, 3a, where the viewing axis 40a is laterally displaced from the optical axis 40 of the objective, makes the system peculiarly useful for e.g. tanks, where the displacement may be vertical and the observer located inside the tank.

One of the peculiar characteristics of my system lies in the fact that stopping the objective down, or stopping the image down at the image plane, reduces the field angle but not the illumination. If, in FIG. 2, the objective is stopped down by a diaphragm having in it such a small hole as indicated at 50, off center, an eye placed behind field lens 26 sees a restricted region of the field through that hole, which appears to be at a position such as 50a, and at the hole the image seen is the reduced field without reduction in the illumination, which is controlled by the eye iris size. If the stopped-down hole is central of the objective, as indicated at 52, the fully illuminated reduced image area, with or without rectification, is also central, as indicated at 52a. The important thing here is that stopping down the system to a smaller image area does not reduce the illumination to the eye or eyes.

Restricting the field may most conveniently be done at the field lens in the focal plane of the objective. FIG. 3 indicates a slide-way 54 at the flat face of the field lens 26 in the focal plane of the objective 28, for insertion of field reducing mats.

FIG. 1 shows, in schematic perspective, a rectifying system equivalent to a porro-prism, involving four reflecting surfaces 60, 62, 64 and 66, usually formed by prismatic total reflecting faces, but here shown schematically as mere surfaces. Using such a rectifier the emerging ray axis 40a is laterally displaced from the objective-ocular axis 40. But a rectifier system of any type may be used, including such a straight-through rectifier of the type known as Brashear-Hastings.

A magnifying lens may be included in the system, for instance in FIG. 1 between the reflectors 62 and 64, as at 70 in FIGS. 3 and 3a. These figures are specifically referred to later.

FIGS. 4 and 5 show, in schematic form, a preferred design. In such a design the objective 28a, although shown as a single lens, may be made up of two plano-convex lenses with their convex faces together. Any such objective throws its aerial image, via the reflectors 60 and 62, on the plane face of field lens 26a. The mirror surfaces 60 and 62 turn the objective image ninety degrees in two planes, that image then falling on the plane face of field lens 26a. Mirrors 64 and 66 then rotate the image another ninety degrees in the two planes for rectified viewing. And the image may be magnified by such a magnifier as shown at 70a. The focal length of the objective is immaterial as long as the objective image is at the field lens. At the image plane on the plane face of the field lens, a slot indicated at 54a may provide for the insertion of mats for field reduction.

An afocal optical element may be associated with any of the lens elements here described for the purpose of changing their focal lengths as may be desired. Thus, zoom lenses may be used with their provisions for changes in focal ratios.

FIGS. 3 and 3a show, in vertical schematic elevation, a worked-out design of the optical system. Here the objective 28 is made up of two elements 280 and 281, the objective effective focal length being about 4.50 inches, measured from the proper point ahead of the objective combination. (In the other simple diagrams where the objective is shown as a simple lens, the focal length is measured from approximately the center of the objective.) Rectangular element 280 is 1.875 inches vertically and 2.375 inches horizontally. The field lens 26 has an effective focal length of 6.30 inches, a rectangular height of 2.126 inches and lateral width of 2.675 inches. The reflective faces 60, 62, 64, 66 are indicated by heavy lines. Window 22 is 2.3 inches high by, in this case, 4.0 inches wide. Magnifier 70 is shown between reflectors 62 and 64 and is designed to have a focal length of 8.00 inches. Its rectangular height is 3.20 inches and width 2.20 inches. Reflectors 60 and 66 have widths of about 2.6 inches. Reflector 64 is of commensurate vertical length, and reflector 66 has about a four inch horizontal length. These FIGURES 3 and 3a are in general to scale, and the various typical dimensions may be scaled by taking window 22 as being 2.3 inches high.

Without the magnifier, the optical system as here described is estimated to give a magnification of somewhat less than unity.

In the foregoing figures the positive field lens 26 is located at the image plane of the positive objective 28, the system being generally Keplerian. In FIG. 6, the negative lens 26b is located inside the image plane of the positive objective 28, and acts to turn the there converging rays from the positive objective to parallelism to be viewed by the eyes behind the negative lens. As in the previously described forms, the negative lens 26b has at least one dimension as great as, or preferably greater than, normal pupillary spacing. The form of the other figures, and particularly that of FIGS. 4 and 5, is however preferred. Among their advantages is, e.g., the capability of having an image plane for a reticle, such as the crossed hairs 44 in FIG. 2.

I claim:

1. A view finder for a camera or the like providing a brilliant, erect image that corresponds to the entire normal field of the camera or the like and that is visible to an operator facing that field, said view finder comprising in combination an objective having an axis and forming on the axis an aerial image of the scene before the camera or the like and including the entire field of view thereof, an image erecting system comprising four plane mirrors and structure mounting the mirrors successively on the axis behind the objective in the relative positions of the reflecting faces of a porro prism, a field lens mounted coaxially adjacent the aerial image and interposed between the mirrors of the erecting system, the field lens having positive power sufficient to direct all image forming bundles of rays from the objective at least to substantial parallelism with the axis, and means at the plane of the aerial image for indicating the field of view of the camera or the like, the image plane being free of diffusing media, the objective, the mirrors and the field lens all having effectively horizontal apertures sufficient to provide normal binocular vision of the entire field of view from a viewing plane spaced behind the fourth mirror.

2. A view finder as defined in claim 1, and including also a positive viewing lens mounted coaxially behind the field lens with at least one of said mirrors spaced between the viewing lens and the field lens, said viewing lens forming an enlarged virtual image of said aerial image, and having an effectively horizontal aperture at least equal to the normal inter-pupillary distance.

3. A view finder for a camera or the like providing a brilliant, erect image that corresponds to the entire normal field of the camera or the like and that is visible to an operator facing that field, said view finder comprising in combination an objective having an axis and forming on the axis of an aerial image of the scene before the camera or the like and including the entire field of view thereof, an image erecting system comprising four plane mirrors and structure mounting the mirrors successively on the axis behind the objective in the relative positions of the reflecting faces of a porro prism, a field lens mounted coaxially adjacent the aerial image and having power sufficient to direct all image forming bundles of rays from the objective at least to substantial parallelism with the axis, a positive viewing lens mounted coaxially behind the field lens and forming an enlarged virtual image of said aerial image, at least one of said field lens and viewing lens being interposed between the mirrors of the erecting system, and means at the plane of the aerial image for indicating the field of view of the camera or the like, the image plane being free of diffusing media, the objective, the mirrors, the field lens and the viewing lens all having effectively horizontal apertures sufficient to provide normal binocular vision of the entire field of view from a viewing plane spaced behind the rearmost element of said system.

4. A view finder as defined in claim 3, and in which the first and second of said mirrors are positioned between the field lens and the viewing lens.

5. A view finder as defined in claim 3, and in which the first and second of said mirrors are positioned between the objective and the field lens, and the third and fourth of said mirrors are positioned between the field lens and the viewing lens.

References Cited

UNITED STATES PATENTS

| 2,423,267 | 7/1947 | Strong | 350—45 |
| 2,578,013 | 12/1951 | Monte | 350—45 |
| 3,011,403 | 12/1961 | Dlutzik. | |

OTHER REFERENCES

Ditchburn, Light Interscience Publishers Inc., New York, 1963, Section 7.20, pp. 256–257.

JEWELL H. PEDERSEN, Primary Examiner

ORVILLE B. CHEW, Assistant Examiner

U.S. Cl. X.R.

350—45, 53, 203, 239